United States Patent Office 3,764,501
Patented Oct. 9, 1973

3,764,501
PHOTOPOLYMERIZABLE POLYAMIDE COMPOSITIONS AND PROCESS FOR THE PREPARATION THEREOF
Takashi Hori and Hiroshi Kodama, Otsu, Japan, assignors to Toray Industries, Inc., Tokyo, Japan
No Drawing. Filed July 30, 1970, Ser. No. 59,722
Claims priority, application Japan, Aug. 5, 1969, 44/61,423
Int. Cl. C08g 41/04; C08j 1/10
U.S. Cl. 204—159.15      1 Claim

ABSTRACT OF THE DISCLOSURE

Photopolymerizable polyamide compositions are provided which are the reaction products of a soluble polyamide polymer and an acrylamide of the formula

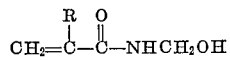

wherein R is hydrogen or methyl. The compositions of this invention are prepared by a process wherein at least a portion of the acrylamide of the above noted formula is reacted onto the polyamide to provide cross-linkable side chains. The photopolymerizable polyamides of this invention can be selectively converted into an insoluble polymer by irradiating the polymer with light and as such are useful in the preparation of photographic printing plates and the like.

BACKGROUND OF THE INVENTION (1) Field of the invention

This invention relates to photopolymerizable polyamide compositions and to the method for preparing said compositions.

(2) Description of the prior art

Conventional polyamides are not substantially cross-linkable or insolubilized by light. Various suggestions have however, been made in the prior art to provide polyamide compositions which can be insolubilized by being irradiated with light. One such suggestion was made in R. M. Leakley et al., U.S. Pat. No. 3,081,168 in which a compound having two terminal double bonds such as N,N'-methylene bisacrylamide and if necessary, a sensitizing agent such as benzophenone was mixed with the polyamide. This mixture could then be irradiated to make it insoluble.

Another method suggested in the prior art is disclosed in E. R. Saner et al. U.S. Pat. No. 2,972,540. According to the Saner's process, light is projected onto a polyamide composition containing acrylyloxy methyl radicals as the side chains. These polyamide compositions are obtained by initially treating a polyamide so that a part of the amide bonds thereof are alkoxymethylated and then this compound is treated with acryl-esterifying agent.

The prior art methods however, had certain disadvantages. In the Leakley et al. method, the solubility of the compounds such as N,N'-methylenebisacrylamide used as the insolubilizing agent in the polyamide was not sufficient and therefore the amount of the agent that could be added was limited. Accordingly, it was difficult, if not impossible, to obtain a photopolymerizable polyamide having a relatively high insolubility. In addition, when the Leakley et al. process was employed, if the product was stored for a long time, the insolubilizing agent tended to ooze out to the surface of the polyamide and thereby becomes ineffective to induce the insolubilizing cross-linking reaction.

In the Saner et al. process, the photopolymerizable radical was bonded to the polyamide and therefore there was no such problems attributable to the mutual solubility as encountered in the Leakley et al. process. However, the Saner's et al. product did not have sufficient photosensitivity and furthermore, the photosensitivity was rapidly inhibited by oxygen such as when the material was stored in an atmosphere containing oxygen such as air. Accordingly, when the Saner's et al. compositions were stored in an atmosphere containing oxygen such as air, for even relatively short periods of time, there was a noticeable and marked decrease in the photosensitivity of the material. A further disadvantage of the Saner's et al. process was that it required a plurality of steps in order to prepare the photosensitive material. The use of a plurality of steps substantially increased the cost of the final product.

It is one of the objects of this invention to overcome the aforementioned problems and difficulties encountered with the prior art processes.

It is a more specific object of this invention to provide photosensitive polyamide compositions having excellent photosensitivity and storage stability.

It is an additional object of this invention to provide a method for producing polyamide compositions capable of being insolubilized by light.

Another object of the present invention is to provide a new method for producing polyamides which can be readily adopted to produce printing master sheets having a high degree of photosensitivity.

Other objects and advantages of the present invention will become further apparent hereinafter and from a continued reading of the specification and subjoined claim.

SUMMARY OF THE INVENTION

The objects of this invention have been achieved by providing soluble photopolymerizable polyamide compositions which are obtained by reacting a soluble linear polyamide with a compound of the formula

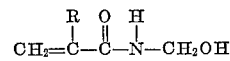

wherein R is hydrogen or methyl in the presence of an acidic catalyst.

DESCRIPTION OF THE PREFERRED EMBODIMENTS

In the process of the present invention a soluble linear polyamide is reacted with N-methylol acrylamide and/or N-methylolmethacrylamide represented by the formula

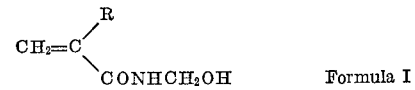

Formula I wherein R is hydrogen or methyl, in the presence of an acid catalyst.

The soluble synthetic linear polyamides employed are prepared by conventional methods from various types of monomers. The monomers preferably have from 3 to 13 carbon atoms and can be for example, (a) condensation polymers of dibasic aliphatic acids and diamines, (b) polymers of ω-amino acids, (c) polymers of lactams or functional derivatives thereof. It is preferable that the polyamides used in the present invention have sufficient molecular weight that the intrinsic viscosity is above 0.1. Homopolymers are most conveniently utilized in the compositions of this invention, but copolymers or block polymers can also be used in the present invention to some advantage. As specific examples of polyamides suitable for use in this invention, the following can be given:

Nylon 3, 4, 5, 6, 8, 11, 12, 13, 66, 610, 1313, etc.;
Polyamides prepared from metaxylylenediamine and adipic acid;

Polyamides prepared from trimethylhexamethylene diamine and terephthalic acid;

Polyamides prepared from 1,4-diaminomethylcyclohexane and suberic acid, or similar linear homopolyamides.

As noted above, copolymers such as nylon 6-nylon 66,
nylon 6-nylon 66-nylon 610,
nylon 6-nylon 66-nylon 610-nylon 612, ε - caprolactam - adipic acid - hexamethylene diamine-4,4-diaminodicyclohexylmethane copolymer-polyamide, etc., can also be utilized. It is also possible to use polyamides having substituents on the carbon atoms or nitrogen atoms comprising the main chain. The method of the present invention can likewise be employed with polyamides containing bonds such as C—O—C or C—S—C, which are not broken or cause adverse side reactions under the reaction conditions employed in the present invention.

From 0.1 to 100 parts by weight, or more preferably from 1 to 50 parts by weight of N-methylolacrylamide or N-methylolomethacrylamide represented by Formula I is used per 100 parts by weight of the soluble linear polyamide. No difficulty is encountered when mixtures of the two kinds of the compounds of Formula I are used.

An acidic catalyst is used in the method of this invention to cause at least a substantial portion of the acrylamides of Formula I to react with the polyamides and form side chains on the polyamides. As the acidic catalyst used in the process of this invention, various kinds of inorganic acids such as sulfuric acid, phosphoric acid, hydrochloric acid, various kinds of organic acids such as carboxylic acids, sulfonic acids, phosphonic acids, phenols or other acidic compounds such as boron trifluoride, ferric chloride or similar Lewis acids can be used.

The amount of the acidic catalyst used in the process of the present invention cannot be easily determined in advance. The relative reactivity of the particular acrylamide compound of Formula I with the various linear polyamides noted above is considerably different. Generally speaking, however, it is preferable to use 0.01 to 100 parts by weight and more preferably from 0.1 to 40 parts by weight based on the weight of the acrylamide compound of Formula I to be reacted.

The products of the present invention can be satisfactorily attained by mixing the N-methylolacrylamide or the N-methylolmethacrylamide and the acidic catalyst and linear polyamide together and then merely heating the obtained mixture at a temperature from 30 to 250° C. and more preferably from 50 to 150° C. It should be noted that the temperature is not critical and excellent results can also be obtained when the reaction is conducted at a temperature above the melting point of the mixture.

Preferably, the reaction is carried out in a solution obtained by using a solvent capable of dissolving both the linear polyamide and the acrylamide compound of Formula I. Suitable compounds are for example, alcohols, halogenated hydrocarbons or the like. However, any solvent can be used providing it does not react with the compounds represented by the general Formula I or the linear polyamide employed under the above noted reaction conditions. When a solvent is used there is no special restriction with regard to the amount of solvent employed, but preferably it should be used in the range of from about 50 to 2,000 parts by weight per 100 parts of the polyamide.

It is believed that the acrylyl radical is introduced as a photoactivatable cross-linkable side chain onto the polyamide chain. It should be noted however, in accordance with the method of the present invention that the entire amount of the acrylamide compound of Formula I need not be necessarily bonded to the polyamide and in fact in some cases, a portion of the compound can be recovered from the final product. More specifically the objects of the present invention can be obtained when from 0.1 to 50 parts by weight of the compound of Formula I is bonded to the linear polyamide with the most preferable results being obtained when about 1 to 30 parts by weight based on 100 parts by weight of the recurring units of the polyamide are bonded to the polyamide structure.

The linear polyamides containing acryl radicals in the side chains obtained in accordance with the above described process of the present invention can readily be converted into the insoluble form with the appropriate type of light as will be more specifically pointed out below. It is also possible to even further increase the photosensitivity by adding an acrylamide derivative of Formula II

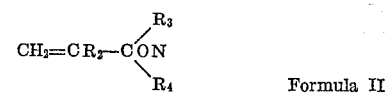

wherein $R_2$ is H or $CH_3$; $R_3$ and $R_4$ are hydrogen atoms, alkyl radicals having from 1 to 4 carbon atoms, or —$CH_2OR_5$ wherein $R_5$ is a hydrogen atom or alkyl radical having from 1 to 4 carbon atoms. Typical examples of the above mentioned compounds of Formula II are as follows:

acrylamidemethacrylamide,
N-methylacrylamide,
N-ethylacrylamide,
N-methylolacrylamide,
N-methylolmethacrylamide,
N-methoxymethylacrylamide,
N-methoxymethylmethacrylamide,
N-butoxymethylacrylamide,
N-butoxymethylmethacrylamide, etc.

The amount of the compounds of Formula II employed in the compositions of this invention should be less than 100 parts by weight per 100 parts by weight of the polyamide containing said acrylyl radicals.

It is also possible to use an unsaturated compound containing more than two double bonds in the compositions of this invention in addition to the above noted acrylamide derivatives.

The photoinsolubilizable polyamides prepared in accordance with the method of the present invention can be mixed with an ordinary non-photosensitive linear polyamide which has not been treated as noted above in order to render the entire mixture photopolymerizable. The mixing operation can be carried out by any conventional means. When a blend of both types of nylons are employed the two nylons can be mixed together along with a thermal polymerization inhibitor in the molten state; in the solid state such as powder state, flake state or grains; or the two components may be dissolved in a solvent such as alcohol and thereafter the solvent removed. The ratio of the mixtures of the nylons is preferably such that from 0.1 to 30 parts by weight of the compound of Formula I is contained per 100 parts by weight of the final mixture.

When the photopolymerizable polyamides of the present invention are used, it is possible to add sensitizing agents or thermal polymerization inhibitors to the compositions. As the sensitizing agent, it is possible to use any of the well known compounds heretofore used as sensitizing agents for photopolymerization of unsaturated compounds. Effective compounds which may be utilized as a sensitizing agent are the following known classes of compounds such as anthraquinone derivatives, benzophenone derivatives, benzoine derivatives, aldehyde, ketones, sulfur compounds, halogen compounds or dyes such as methylene blue, riboflavin, uranyl nitrate, etc.

The amount of the compound used as a sensitizing agent can be from 0.01 to 100 parts by weight per 100 parts by weight of the compound of Formula I which is bonded to the polyamide.

Suitable classes of compounds having thermal polymerization inhibiting effects are for example, the hydroquinone derivatives, phenol derivatives, nitro substituted benzenes, benzoquinone derivatives, 1,4-naphthoquinone derivatives, etc.

The amount of the thermal inhibitors employed should be from 0.01 to 10 parts by weight based on 100 parts by weight of the compound of Formula I which is bonded to the polyamide.

Any light can be employed for insolubilizing the photopolymerizable polyamide compositions of the present invention whose wave length is less than 500 m$\mu$. Especially effective is light having a wave length of from 200 to 450 m$\mu$. Such light can be easily obtained by means of low pressure, high pressure or ultra-high pressure mercury lamps, xenon short arc lamps or xenon pulse lamps.

The time of irradiation required for insolubilizing the polyamide compositions of this invention is determined by the ratio of the compounds of Formula I bonded to the polyamide to the total amount of the whole polymer; the presence or absence of the addition of the acrylamide derivatives of Formula II; the amount thereof; the kind of the light source utilized; the distance from the light source to the object to be irradiated; the transparency of the object to be irradiated and the thickness thereof; the desired degree of insolubility; the kind and concentration of the photosensitizers in the polyamide compositions and certain other factors. Therefore, the time cannot be defined simply, but when a composition sheet of 1 mm. thickness is to be treated so as to be insolubilized it can be sufficiently carried out within as short a time as from several seconds to several minutes when the irradiation is carried out by using a 500-watt ultra-high pressure mercury lamp at a distance of 30 cm. There is no restriction with regard to the atmosphere in which the insolubilization of the polyamide is carried out by the irradiating light with air generally being employed. There is also no special restrictions on the temperature at which the object is irradiated with the light.

It is desirable that the composition to be insolubilized by the photopolymerization should have a high permeability of light especially in the ultraviolet light range. It is however, possible to add small amounts of additives such as pigment, stabilizers, plasticizers, fillers or polymers other than polyamides, in addition to the materials noted above such as thermal polymerization inhibitors, photosensitizers, compounds having a plurality of double bonds or acrylamide derivatives of Formula II without substantially affecting the photopolymerization of the resin which causes the insolubilization of the polyamides of the present invention.

The primary advantages of the present invention reside in that it is possible to produce polyamide compositions having remarkably high photosensitivity in comparison with the prior art polyamide compositions. The compositions of the present invention can be made remarkably insoluble by treating the compositions with light of the proper type for relatively short periods of time. In addition, the polymer compositions before being subjected to irradiation with light are hardly affected by oxygen and therefore, the plates prepared from the polyamides of this invention have extended stability even in the presence of oxygen. An additional advantage of the photopolymerizable polyamide compositions obtained in accordance with the method of the present invention is that they have excellent solubility with ordinary polyamides. The photopolymerizable polyamides of this invention can be blended with ordinary polyamides and by irradiating the entire compositions with light, an insoluble polyamide product can be produced. Using this method, the disadvantages of the prior art such as photosensitizing polymerization agents oozing out of the polyamide article during storage and the limitations with regard to the amount of the photosensitizing agents that can be employed are not encountered.

Polyamides prepared in accordance with the process of this invention which have been insolubilized by use of light in accordance with the method of this invention, have improved resistance towards solvents and chemicals in comparison to conventional polyamides. The polyamide compositions of this invention, when polymerized, are hardly attacked when the surface of the polyamide is contacted with solvents or various types of chemicals.

In addition the thermal resistance of the polyamide compositions photopolymerized in accordance with the method of this invention is substantially improved and can be used at higher temperatures than conventional polyamides.

The photoinsolubilizable polyamides obtained in accordance with the present invention do not lose their solubility unless irradiated with ultraviolet rays. Therefore, when the shaped articles are treated with solvents of polyamides after having been irradiated with ultra violet rays in predetermined areas, relief images of the shaped articles can be formed. It is therefore possible to produce the shaped articles having fine concave-convex patterns on the surface thereof without carrying out complex mechanical processing steps such as etching.

There are many applications for the process of this invention such as preparing printing master sheets for relief printing, offset printing or lithographic printing, or displays and the like.

The following examples are given by way of illustration to further point out the novel features of the present invention. The following examples are not intended to restrict in any way the scope of the present invention beyond that of the subjoined claims. All parts are given by weight, not parts by volume unless otherwise indicated.

In the following examples, the gelation rate of the photoinsolubilized polyamide composition is represented by the percentage of the weight of the insolubilized material against the weight of the sample when the pellets of the photoinsolubilized sheet whose thickness was about 1 mm. were charged into a metal net vessel (50 mesh) made of stainless steel, and the pellets were thermally refluxed in methanol for 5 hours.

EXAMPLE 1

95 parts by weight of the copolymer nylon 6/66/610/612 commercially known as Amilan X-8000 produced by Toray Industries, Incorporated, Japan, was dissolved in 200 parts by weight of methanol at the reflux temperature of the methanol. 0.2 part by weight of hydroquinone, 5 parts by weight of N-methylolacrylamide, and 1 part by weight of P-toluenesulfonic acid were added and the resulting mixture was heated to reflux. Reflux was continued for 15 minutes and then 4 parts by weight benzophenone was added to the reaction mixture.

The modified polyamide composition thus obtained by evaporating out methanol from the mixture was shaped into a 1 mm. thick sheet at 150° C. using a compression-press. The sheet was colorless, transparent, and it could be completely dissolved in methanol. The sheet was irradiated with the light of a 500-watt high pressure mercury lamp set at a distance of 30 cm. from the sheet for one minute. The sheet, after irradiation, was insoluble in hot methanol and the gelation rate thereof as measured in refluxing methanol for 5 hours was 89.1%.

EXAMPLE 2

Example 1 was repeated with the exception that N-methylol methacrylamide was used in place of N-methylolacrylamide. The pressed sheet, before irradiation, could be dissolved in methanol. However, after the sheet had been exposed to light, it would not dissolve in methanol and gelation rate thereof, obtained in accordance with the method of Example 1, was 79.8%.

EXAMPLE 3

Example 1 was repeated with the exception that concentrated sulfuric acid was used in place of P-toluene sulfonic acid. The pressed sheet, before being irradiated, could be dissolved in methanol. However, after the sheet had been exposed to light, it would not dissolve in methanol and the gelation rate obtained in accordance with the method of Example 1 was 91.4%.

EXAMPLE 4

Example 1 was repeated with the exception that a copolymer ε-caprolactam-adipic acid-hexamethylene diamine - 4,4' - diaminocyclohexylmethane commercially known as Ultramide IC, produced by BASF was used in place of the nylon copolymer employed in Example 1. The pressed sheet could be dissolved in hot methanol but the sheet after having been exposed to light could not be dissolved in methanol. The gelation rate obtained in accordance with the method of Example 1 was 88.0%.

EXAMPLE 5

90 parts by weight of the copolymer of nylon 6/66/610 commercially known as Amilan CM-4000, produced by Toray Industries, Incorporated, Japan, was dissolved into 200 parts by weight of methanol at the reflux. To this mixture there was then added 0.1 part by weight of hydroquinone, 10 parts by weight of N-methylolacrylamide and 1 part by weight of P-toluene sulfonic acid. Reflux was continued for 10 minutes and then 2 parts by weight of benzophenone was added thereto and blended so as to obtain a homogeneous solution. The obtained solution was then poured onto a glass plate and the methanol was evaporated out. The resulting sheet of the modified polyamide composition was pressed into a 1 mm. thick sheet by means of a compression press at 140° C. The sheet was colorless, substantially transparent, photosensitive and could be dissolved in methanol. The sheet was irradiated with the light of a 500-watt ultra-high pressure mercury lamp set at a distance of 30 cm. from the sheet for one minute. The irradiated sheet was insoluble in methanol. The gelation rate as measured in refluxing methanol for 5 hours was 91.9%.

A portion of the photosensitive sheet obtained above was adhered to an aluminum base plate by means of bilateral adhesive tape to prepare a photosensitive master sheet for printing. A negative and Gray scale (produced by Stauffer Company, U.S.A., 21 Step Sensitivity Guide) were closely adhered to the photosensitive layer of the master sheet. The master sheet was fixed within the frame of a vacuum printer and the sheet was irradiated with the light of a 500-watt ultrahigh pressure mercury lamp at a distance of 30 cm. for 20 minutes. The negative and Gray scales were peeled off and methanol was sprayed onto the irradiated master plate under the pressure of 5 kg./cm.² for three minutes. The printing master sheet thus obtained had sharp and excellent reliefs corresponding to the negative. The portion of the Gray scale was hardened as far as Number 17. The thus obtained printting master could be used for printing immediately after it was dried.

In order to determine the deterioration rate of the photosensitivity caused by storage of the photosensitive sheet, the same exposure and development were carried out as before on photosensitive sheet which had previously been left exposed to the air in a dark place for 5 days. It was still possible to obtain almost the same quality printing master sheet as that which was obtained with the freshly prepared material. The portion of the Gray scale was hardened as far as Number 10.

EXAMPLE 6

Example 5 was repeated with the exception that N-methylol methacrylamide was used in place of the N-methylolacrylamide and a nylon commercially known as Ultramide IC, produced by BASF was used in place of the nylon copolymer employed in Example 5. The gelation rate obtained using the same method as in Example 5 was 81.5%. The unexposed sheet was adhered onto an aluminum plate using the same exposure and development techniques as were employed in Example 5 and a printing master sheet was obtained having excellent definition. The portion of the Gray scale was hardened as far as Number 15.

CONTROL EXAMPLE 1

Example 5 was repeated without using any P-toluene sulfonic acid. The gelation rate, measured as in Example 5, was 47.27%. The obtained photosensitive sheet was adhered to an aluminum plate in the same manner as that in Example 5. The printing master that was obtained had imperfect photosensitivity. The portion of the Gray scale was hardened as fast Number 10. The photosensitive sheet, after having been exposed to air in a dark place for 5 hours, was adhered onto an aluminum sheet in the same manner as before, and the portion of the Gray scale was hardened as far as Number 7.

CONTROL EXAMPLE 2

Control Example 1 was repeated with the exception that N,N'-methylene bis-acrylamide was used in place of N-methylolacrylamide. The gelation rate obtained in the same manner as in Example 5 was 3%. The photosensitive sheet was adhered onto an aluminum plate and in the same manner as in Example 5, a printing master sheet was prepared. The portion of the Gray scale was found to have hardened as far as Number 11.

An unexposed portion of the sheet was exposed to air in a dark place for 50 hours. A considerable amount of the N,N'-methylene bis-acrylamide was found to have oozed out onto the surface of the sheet, and the sheet had acquired a white turbidity. Exposure and development were carried out as in Example 5. The thus obtained printing master sheet however, had poor definition and was unsuitable for making sharp, clear prints. The portion of the Gray scale was hardened as far as Number 8.

EXAMPLE 7

80 parts by weight of nylon 6/66/610/612 copolymer (Amilan CM-4000 produced by Toray Industries, Incorporated, Japan) was added to 200 parts by weight of methanol and dissolved in the methanol at the reflux temperature. Then 1 part of hydroquinone, 20 parts of N-methylol acrylamide and 1 part of P-toluene sulfonic acid were added. Reflux was continued for 30 minutes. The resulting reaction product was poured into acetone and the polyamide copolymer having acrylamide methyl radical side chains was precipitated. Ten parts of this polyamide composition having acrylamide methyl radicals on the side chains was dissolved into 200 parts of refluxing methanol along with 0.2 part of hydroquinone and 4 parts of benzoylmethylether.

A sheet of the polyamide composition was obtained by evaporating out the methanol from the solution and pressing the polyamide composition into a 1 mm. thick sheet at 150° C. This sheet was colorless, transparent and could be completely dissolved in hot methanol. The polyamide sheet was then irradiated with the light of a 30 A. carbon arc lamp at a distance of 40 cm. for one minute. The sheet then was found to be insoluble into methanol. The gelation obtained after reflux in methanol for 5 hours was 83.3%.

EXAMPLE 8

60 parts of the copolymer of nylon 6/66/610/612 commercially known as Amilan X-8000 produced by Toray Industries, Incorporated, Japan, was dissolved into 200 parts of refluxing methanol and then 0.1 part of hydroquinone and 40 parts of N-methylolacrylamide and 1 part of concentrates sulfuric acid were added to the mixture. Reflux was continued for 15 minutes.

The reaction mixture was poured into acetone and a polyamide composition having acrylamide methyl radicals as side chains was precipitated. Fifty parts of this polyamide composition having the acrylamide methyl radical side chains was dissolved into 200 parts of methanol along with 1 part of hydroquinone and 0.5 part of benzoin methylether. This solution was poured onto a glass plate and the methanol was evaporated. The thus obtained sheet of the photosensitive polyamide composition was pressed into a 1 mm. thick sheet at 140° C. The gelation rate of the sheet obtained in the same manner as that in Example 5 was 73.3%. The photosensitive sheet was adhered to an aluminum plate to prepare a printing master in the same manner as in Example 5 and a printing master sheet having excellent definition was obtained. The portion of the Gray scale was hardened as far as Number 14.

EXAMPLE 9

75 parts of the copolymer of nylon 6/66/610 commercially known as Amilan CM–4000 produced by Toray Industries, Incorporated, Japan, was dissolved into 200 parts of refluxing methanol. 0.1 part of hydroquinone, 10 parts of N-methylolacrylamide, and 0.5 part of concentrated sulfuric acid were added and reflux was continued for 10 minutes. The thus obtained solution was poured onto a glass plate and the methanol was evaporated. The obtained sheet of photosensitive polyamide composition was pressed into a 1 mm. thick sheet at 140° C. The photosensitive sheet was colorless, transparent and could be dissolved into methanol. The gelation rate of the obtained sheet was 92.6% as measured in accordance with the method as disclosed in Example 5. When this photosensitive sheet was adhered onto an aluminum plate and printing master sheet was prepared in the same manner as in Example 5 a printing master sheet having excellent definition was obtained. The portion of the Gray scale was hardened as far as Number 19.

CONTROL EXAMPLE 3

100 parts of N-methacrylylmethylmethyl polyhexamethylene-adipamide prepared in accordance with the method of U.S. Pat. No. 2,972,540 as in Example 1, 0.1 part of hydroquinone, and 2 parts of benzophenone were dissolved into 200 parts of methanol. The thus obtained solution was poured onto a glass plate and the methanol was evaporated. The obtained sheet of the modified polyamide composition was pressed into a 1 mm. thick sheet at 140° C. The gelation of the thus obtained photosensitive sheet was 66.19% as measured under the same conditions as in Example 5. When the unexposed photosensitive sheet was adhered onto an aluminum plate and a printing master was obtained under the same conditions as in Example 5, the portion of the Gray scale was hardened as far as Number 13. However, when the unexposed photosensitive sheet was pressed and exposed to air in a dark place for 5 days and thereafter the same exposure and development were carried out as in Example 5, the portion of the Gray scale was hardened as far as Number 6.

What is claimed is:
1. The process for the manufacture of photographic printing master sheet which comprises the steps of:
   (1) reacting 100 parts by weight of a soluble linear polyamide polymer having an intrinsic viscosity above 0.1 obtained by the polymerization of (a) dibasic aliphatic acids having from 3–13 carbon atoms with aliphatic diamines having from 3–13 carbon atoms and/or (b) an aliphatic ω-amino acid having from 3–13 carbon atoms and/or (c) an aliphatic lactam having from 3–13 carbon atoms, with from 0.1 to 100 parts by weight of an acrylamide selected from the group consisting of N-methylol acrylamide, N-methylol methacrylamide and mixtures thereof in the presence of from 0.01 to 100 parts by weight of an acidic catalyst at a temperature in the range of from about 30° C. to about 250° C. in an inert solvent in which both said linear polyamide and said acrylamide are soluble and the amount of said solvent is in the range of from about 50 to 2,000 parts by weight per 100 parts of said linear polyamide to form photopolymerizable composition,
   (2) forming said composition into a sheet, and irradiating said sheet with light of approximately 200–450 mμ in pre-selected portions thereof until said portions are insoluble in methanol and then treating said sheet with a solvent for the remaining portions of said sheet whereby a relief surface is formed on said sheet.

References Cited
UNITED STATES PATENTS

| | | | |
|---|---|---|---|
| 3,188,228 | 6/1965 | Magat et al. | 204—159.19 |
| 2,972,540 | 2/1961 | Saner et al. | 204—159.19 |
| 2,921,006 | 1/1960 | Schmitz et al. | 204—159.15 |
| 3,535,141 | 10/1970 | Marco | 260—851 |

JOHN C. BLEUTGE, Primary Examiner

U.S. Cl. X.R.

96—115 P; 204—159.19; 260—849, 851, 857 G